United States Patent [19]

Dahlin et al.

[11] Patent Number: 5,119,397

[45] Date of Patent: Jun. 2, 1992

[54] COMBINED ANALOG AND DIGITAL CELLULAR TELEPHONE SYSTEM HAVING A SECONDARY SET OF CONTROL CHANNELS

[75] Inventors: Jan E. Å S. Dahlin, Järfälla, Sweden; John R. Bohaychuk, Richardson, Tex.

[73] Assignee: Telefonaktiebolaget L M Ericsson, Stockholm, Sweden

[21] Appl. No.: 514,540

[22] Filed: Apr. 26, 1990

[51] Int. Cl.⁵ .............................................. H04Q 7/02
[52] U.S. Cl. ........................................ 375/5; 379/59; 455/32.1; 455/33.1
[58] Field of Search ................ 379/59, 60, 63; 375/5; 455/31, 32, 33, 38, 53, 54, 56; 370/92, 93; 340/825.1, 825.12, 825.13, 825.57, 825.62, 825.69

[56] References Cited

U.S. PATENT DOCUMENTS

| | | | |
|---|---|---|---|
| 4,127,744 | 11/1978 | Yoshikawa et al. | 379/59 |
| 4,144,411 | 3/1979 | Frenkiel | 379/59 |
| 4,352,955 | 10/1982 | Kai et al. | 455/31 |
| 4,534,061 | 8/1985 | Ulug | 455/17 |
| 4,551,852 | 11/1985 | Grauel et al. | 455/33 |
| 4,573,206 | 2/1986 | Grauel et al. | 455/33 |
| 4,633,509 | 12/1986 | Scheinert | 455/33 |
| 4,670,905 | 6/1987 | Sandvos et al. | 455/33 |
| 4,679,225 | 7/1987 | Higashiyama | 455/32 |
| 4,750,198 | 6/1988 | Harper | 379/59 |
| 4,775,998 | 10/1988 | Felix et al. | 379/59 |
| 4,799,253 | 1/1989 | Stern et al. | 379/59 |
| 4,837,800 | 6/1989 | Freeburg et al. | 455/33 |
| 4,837,858 | 6/1989 | Ablay et al. | 455/34 |
| 4,850,033 | 7/1989 | Eizenhofer et al. | 455/56 |
| 4,870,696 | 9/1989 | Yorita | 379/60 |
| 4,914,651 | 4/1990 | Lusignan | 379/59 |

OTHER PUBLICATIONS

Greger Jismaim et al., "Ericsson Telephones for Cellular Systems", ERICSSON REVIEW, No. 3, 1987, pp. 142-150.

Primary Examiner—Benedict V. Safourek
Attorney, Agent, or Firm—Burns, Doane, Swecker & Mathis

[57] ABSTRACT

A method and apparatus for directing mobile stations in a cellular mobile radio system to different sets of control channels, depending on whether the land system and the mobile stations have digital capabilities. The mobile stations operate to initially scan the same primary set of control channels and to read one of them, and to make a determination, based on the value of certain bits transmitted over the control channel and also the digital capabilities of the type of mobile station involved, whether to continue operation on the primary set of control channels, or whether to scan and read any secondary set of control channels. If a mobile station with digital capabilities decides to scan the secondary set of control channels, but does not find such channels, the mobile station determines that there are no secondary sets of control channels. In this case, if the mobile has analog capabilities, the mobile station will return to scanning the primary set of control channels.

45 Claims, 4 Drawing Sheets

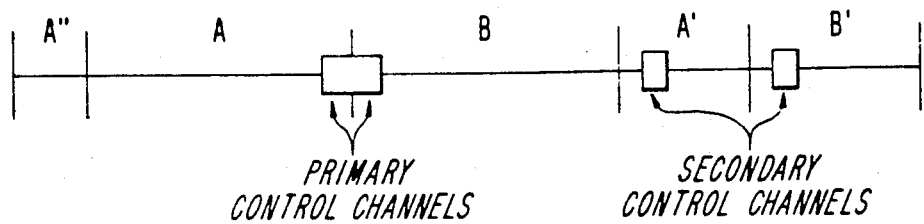

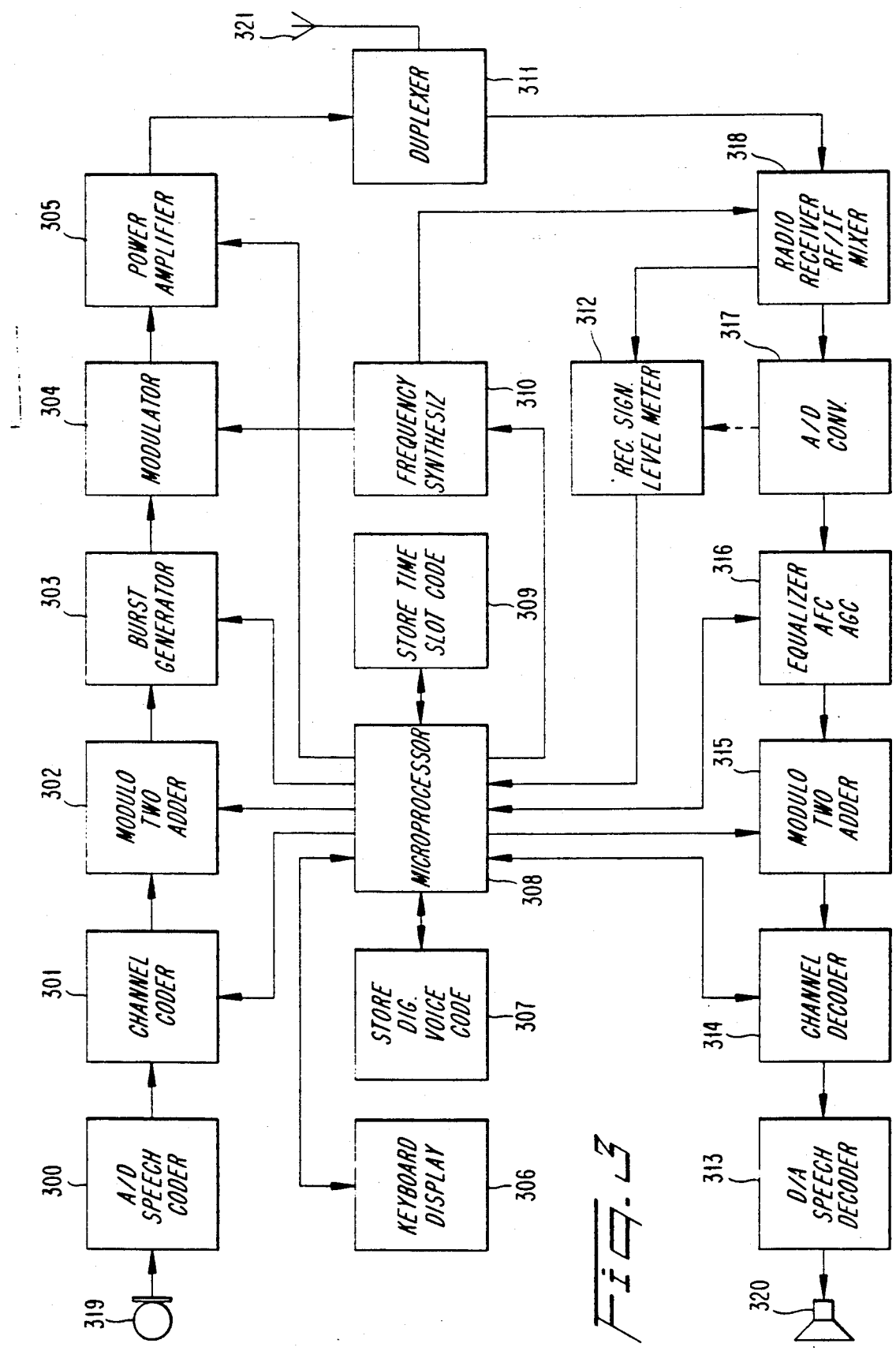

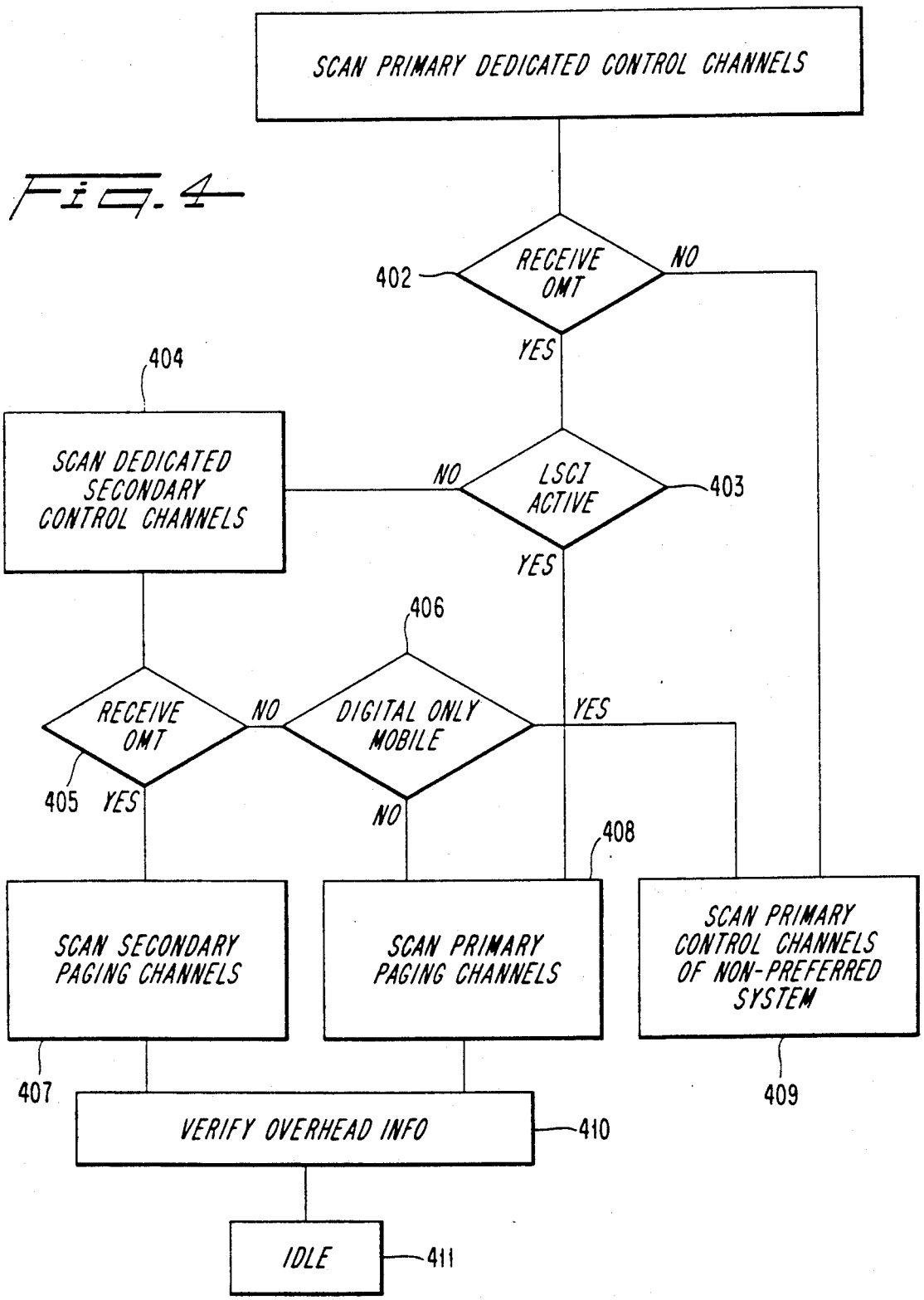

COMBINED ANALOG AND DIGITAL CELLULAR TELEPHONE SYSTEM HAVING A SECONDARY SET OF CONTROL CHANNELS

FIELD OF THE INVENTION

The present invention is directed to cellular mobile telephone systems utilizing both analog and digital voice/data channels for transmitting analog or digital information between land systems and mobile stations which have analog only, digital only, or dual analog/digital capabilities. More particularly, the invention provides a method and apparatus for allowing analog, digital, and dual analog/digital mobile stations to coexist in a flexible manner in the same land system without the need of equipment changes and without limits to the use of the cell and channel frequency plan of the land system.

BACKGROUND OF THE INVENTION

According to known cellular telephone systems, the transition from analog to digital communication within the same frequency band may be performed by replacing seriatim each of the fixed analog channels with three digital channels while maintaining the station sites, cell sizes, and frequency reuse plans which were designed for the analog system having a carrier-to-interference ratio C/I approximately equal to 18 dB. A system having a C/I ratio equal to 18 dB is one in which the signal strength of the carrier is designed to be 18 dB above the signal strength of the interference occurring at the cell borders.

A transition from analog to digital communication in the cellular telephone system according to the method described above implies the following conditions. Initially, the capacity increase of the system is limited to a factor of 3.7 by the unchanged frequency reuse plan. This factor accounts for the value of 3 due to the replacement of one analog channel by three digital channels, and the trunking of three times as many channels in one group. The result being, according to an Erlang table, a total increase of capacity by a factor of 3.7. While being relatively awkward, it is, of course, possible to introduce a new frequency reuse plan at a later time. The operator of the cellular telephone system may desire to obtain equipment from a supplier or manufacturer different from the one who supplied the analog system in place to adapt digital communication capabilities. This is an expensive and cumbersome option in that in order to achieve compatibility between the analog and the digital components, the new supplier must replace the fixed analog equipment in addition to providing new digital equipment.

It is, therefore, desirable to have an alternate method of introducing digital channels where the fixed analog system may be left unmodified, while introducing a completely independently digital system. Furthermore, it is desirable to have the option of utilizing the same or separate station sites, the same or different cell sizes, and the same or different frequency reuse plans.

With respect to cell size, it may be an advantage in an early stage of digitalization of the cellular telephone network to sue digital cells which are larger than the existing analog cells. This configuration will require less equipment while maintaining digital coverage over a large area. Conversely, during a later stage of digitalization of the cellular telephone network it may be an advantage to use analog cells which are larger than the digital cells because at that time the analog cells will be handling less communication traffic than the digital cells.

With respect to frequency reuse, it is possible to plan for a C/I ratio of 10 dB in systems using digital transmission due to the redundancy in the digital code which results in good transmissions occurring at higher disturbance levels than what is possible when using analog transmission. Planning for a system with a C/I ratio of 10 dB enables a denser frequency reuse plan and therefore a higher number of cells per site, which in turn results in higher communication traffic per unit area. The primary purpose of introducing digital voice channels is to increase the communication traffic capacity of the fixed land system, i.e. to allow the land system to serve more mobile stations in a given area. This result may be achieved by combining the aforementioned method of replacing one analog voice channel with three digital voice channels with the method of introducing a denser frequency reuse plan for digital voice channels. In addition, the proposed alternative method of introducing digital voice channels allows the operator to leave the fixed analog system unmodified, except for the canceling of certain assigned frequencies, while new digital equipment is procured which will take over these frequencies.

In existing analog cellular systems, only one set of control channels is generally utilized. The set of control channels comprises dedicated control channels (DCC), paging channels (PC) and access channels (AC). These control channels are used for setting up calls, informing the land system about location and parameters of mobile stations, and for informing the mobile stations about the parameters of the land system. All mobile stations scan and read one of the dedicated control channels when the mobile stations become active or after a certain time has elapsed, or when ordered, or even when the mobile stations enter a new geographical part of the cellular system. The information broadcast by the land system includes a sequence of reserved bits, which are set to an inactive value, e.g. 0, with the intention of enabling future extensions of the protocol.

SUMMARY OF THE INVENTION

The present invention consists of a method and apparatus comprising at least one additional set of control channels which are in addition to the set of control channels of the original analog system, referred to herein as the primary control channels. The additional set of control channels will be referred to herein as the secondary control channels. All mobile stations, i.e. analog, digital and dual capabilities, initially scan the primary control channels and read the channel with the highest or next to highest signal strength. At least one of the reserved bits in the protocol of the primary control channels are utilized to indicate to the mobile stations whether the land system broadcasting the information has only the original analog capabilities, or whether the mobile station has other digital capabilities. The indicating bits of the primary control channels are referred to herein as the land system capability indicator bits or LSCI-bits.

If the LSCI-bits transmitted by the land system over the primary setup control channels indicate an active value, e.g. 1, the system broadcasting the LSCI-bits has digital capabilities. Digital and dual analog/digital mobile stations will continue to use the primary control channels in this situation. Analog mobile stations will proceed as usual, because they are not affected by the LSCI-bits.

Should the LSCI-bits transmitted by the land system over the primary set of control channels indicate an inactive value, e.g. 0, the system broadcasting the LSCI-bits has analog capabilities only. All of the analog mobile stations within the system will proceed as usual, whereas the mobile stations with digital capabilities are directed by the inactive value of the LSCI-bits to scan the frequencies of the secondary set of control channels, in order to detect if an independent secondary set of control channels associated with a separate digital system exists.

In the situation where a separate digital system does exist, the mobile stations with digital capabilities will scan and read the secondary set of control channels. If a separate digital system does not exist, the mobile stations with dual analog/digital capabilities will return to scan the primary set of control channels of the preferred system, and the mobile stations with only digital capabilities are permitted to scan the control channels associated with any non-preferred system.

BRIEF DESCRIPTION OF THE DRAWINGS

FIG. 1 illustrates an embodiment of the present invention wherein primary and secondary control channels are implemented in the frequency band allocated to mobile telephony systems;

FIG. 2 illustrates an embodiment of the system parameter overhead message utilized in conjunction with the present invention;

FIG. 3 illustrates a block diagram of a digital mobile station according to the present invention;

FIG. 4 illustrates a flow chart for the selection of primary and secondary control channels by mobile stations with analog, digital, or dual analog/digital capabilities according to the present invention.

DETAILED DESCRIPTION OF THE ILLUSTRATED EMBODIMENTS

Figure 5:
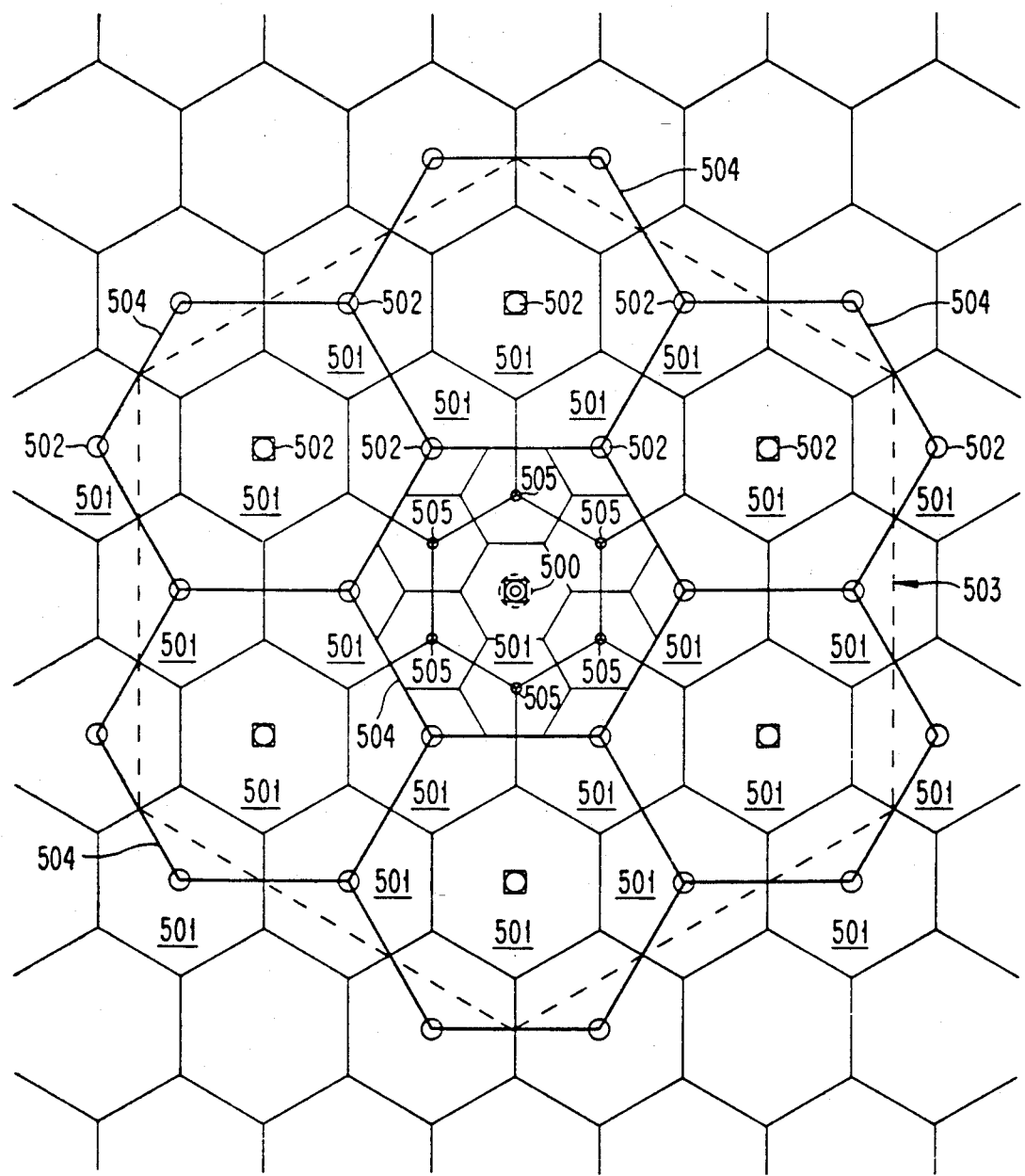
FIG. 5 illustrates a system cell diagram having cells of varying sizes wherein the same base sites are utilized for analog cells and digital cells, respectively.

Referring now to FIG. 1, a possible assignment of frequencies for a primary and a secondary set of control channels for a cellular telephone system is illustrated. The frequency bands in this example (A, B, A', B', A") are those specified for U.S. cellular telephone systems in the standard EIA/TIA-553 for frequency parameters. In this example, A is a preferred system and B is a non-preferred system. The frequencies for the primary control channels are those given in the standard EIA/TIA-553. The frequencies utilized for the secondary control channels are derived from the extended frequency band A', B' as shown in FIG. 1. The number of secondary control channels may be equal to the number of primary control channels, e.g. 21, in each extended frequency band A' and B'.

The present invention, therefore, provides for a second set of control channels in each frequency band that will be scanned by mobile stations which are compatible with the new cellular system standard IS-54. This configuration allows for digital voice channel umbrella cells to be established in currently fixed analog system markets. In order to allow for the use of a second subset of control channels, it is proposed to use certain reserved bits of the system parameter overhead message (SPOM) which are utilized as the protocol capability indicator (PCI), to further direct the mobile stations to the primary control channels and digital systems where calls utilizing the previously mentioned umbrella cells are not required. As it may be desirable not to modify the fixed analog system, when the PCI has an inactive value, e.g. 00, the mobile station will scan the secondary control channels. In this mode, the mobile station is informed that the land system generating the primary control channels does not have digital communication capabilities and therefore it must then scan the secondary control channels in order to locate a preferred system with digital capabilities. If the PCI is at a value other than inactive, e.g. 01 or 10, the mobile station will continue to scan the primary control channels. The PCI field is utilized in the present invention as the previously mentioned land system capability indicator bits (LSCI-bits).

FIG. 2 illustrates an example of the system parameter overhead message (SPOM) utilized in conjunction with the present invention. The SPOM generally will consist of two word trains, word 1 and word 2. The $T_1T_2$ field at the beginning of each word represents an indication of message type, and a value of "11" indicates an overhead word. Immediately following the type field is the digital color code (DCC) field. Word 1 further includes a system identification field (SID1), an authentication procedure field (AUTH), and a reserved field (RSVD) of bits for future use. The protocol capability indicator field (PCI) is set to an active value if the designated control channel can assign digital traffic channels. A number of additional words coming field (NAWC) is set to a value which is one less than the total number of words in the overhead message train. An overhead message type field (OHD) of word 1 is set to a value of "110" indicating the first word of the system parameter overhead message. The OHD field of word 2 is set to "111" indicating the second word of the system parameter overhead message. Also included at the end of word 1 and word 2 is a parity field (P).

Word 2 includes the following fields: a serial number field S; an extended address field E; a registration field for home stations (REGH); a registration field for roaming stations (REGR); a discontinuous transmission field (DTX); a field (N-1) for indicating the number of paging channels in the system; a read control filler field (RCF); a combined paging/access field (CPA); a field (CMAX-1) for indicating the number of access channels in the system; and an end indication field (END) which is set at "1" to indicate the last word of the overhead message train, and set to "0" if it is not the last word.

FIG. 3 illustrates a block diagram of a digital mobile station utilized in conjunction with the present invention. The mobile station comprises a microphone 319 connected to an analog to digital speech coding unit 300 for coding speech or sound into a binary code with a bit rate or bandwidth less than 11 kHz, preferably about 7 to 8 kHz. Connected to the speech coding unit is a channel coding unit 301 which interleaves error protecting coding of the digital information from the speech coding unit 300. The channel coding unit 301 is connected to a modulo two adder 302 for modulo two adding of a digital voice color code to the digital information from the channel coding unit 301. The modulo 2 adding unit is connected to a burst generator 303 for collecting information to be transmitted in a burst and arranging the information into a proper burst. When the mobile station is used for data transmission on a connection or during a connection set up, the burst generator 303 generates data and/or control information in the burst instead of digitized speech. Such information may be supplied from a keyboard 306 through a microprocessor 308 and the channel coding unit 301 or directly from the microprocessor 308. A modulator 304 is connected to the burst generator 303 for receiving the digital information to be modulated on a radio frequency carrier from a frequency synthesizer 310 and which is to be amplified in a power amplifier 305. The modulation method used may be continuous phase modulation or other modulation types suitable for digital information transmission. The power amplifier 305 is connected to an antenna 321 via a duplexer 311 and is controlled from the microprocessor 308.

The mobile station also comprises a radio receiver 318 connected to the duplexer 311, a radio signal strength or level measuring unit 312, and an analog to digital converter 317. The radio receiver 318 includes RF and IF stages with a filter, demodulator, etc. An equalizer 316 is operable for equalizing the digital communication channel and automatic frequency control and automatic gain control. An input of the equalizer 316 is coupled to the radio receiver 318 output via the analog to digital converter 317. The output of the equalizer 316 is connected to the input of a modulo two adder 315. The modulo two adder 315 is provided to add a digital voice color code modulo two to the digital information from the equalizer 316. The modulo two adder 315 output is connected to a channel decoder 314 which is operable for deinterleaving, error detection, and correction of digital information from the modulo two adder 315. The measurement of bit error rate on an established connection is performed in channel decoder 314 in cooperation with the microprocessor 308. A digital to analog speech decoder 313 for converting digital information to analog information or speech is connected to the channel decoder 314 and a speaker 320.

When the mobile station is tuned to a radio channel used by a particular base station as a control channel, some of the components of the mobile station are not used, in particular the channel and speech decoders 314 and 313, respectively. When control and monitoring information is transmitted from the base station on the control channel being read, the microprocessor 308 receives and interprets signals from the analog to digital converter 317.

The mobile station according to FIG. 3 may operate on time division multiplex digital communication channels in a way similar to known digital mobile radio stations, e.g. of the kind disclosed in the GSM standard or in Ericsson Review number 3, 1987. Accordingly, there is no particular need herein to further describe in detail the overall operation or the detailed operation of the various components. With respect to the time slot identifier code and the digital color code, the mobile station includes respective units 307 and 309 for storing all possible time slot identifier codes and digital voice color codes to be used in communication with a base station. The microprocessor 308 receives instructions from the base station as to which codes to use and the particular connection. The microprocessor 308 then reads the codes from the storage units and supplies the modulo two adders 302, 315 and burst generator 303 with the appropriate time slot identifier code and digital voice color code.

Upon receiving radio signals from a base station, the synchronization and recognition of the time slot identifier code is performed in the equalizer 316 in cooperation with the microprocessor 308. The use of equalizers and methods of synchronization and bit error measurement are well known to those skilled in the art. Accordingly, there is no need herein to further describe such methods or components for performing these functions.

The procedure for a call connection in a cellular mobile station according to FIG. 3 will now be described. When the control channel to be used for the call connection is a digital communication channel, the base station informs the mobile station not only on the radio channel, but also on the time slot and digital voice color codes to be used in the connection. During the set up procedure, the base station also informs the mobile station on a plurality of radio channels the signal strength on which to be measured by the mobile station. Normally, this plurality of radio channels are the radio channels utilized for control channels by adjacent base stations or cells.

Depending upon the movement of the mobile stations as well as other circumstances, a new plurality of radio channels may be selected and corresponding information may be transmitted to the mobile station from the responsible base station during the course of the connection. During the course of a connection for which a digital communication channel is used, the mobile station measures the signal strength of the control channels on the given plurality of radio channels. Measurements may be done during time slots not used by the digital communication channel. The mobile station also measures signal strength on the digital communication channel used for the established connection and the bit error rate on the established connection.

With reference now to FIG. 4, the sequence of control channel scanning to determine which set of control channels to use is illustrated, the sequence being in accordance with the cellular system standard IS-54. Initially, the mobile station operates to scan the primary dedicated control channels generated from a preferred system A, for example, at step 401. The mobile station examines the signal strength of each of the primary control channels so that only the channel with the highest or next to highest signal strength will be read by the mobile station. At step 402 the mobile station will determine whether it has actually received the system parameter overhead message train associated with the primary control channel which is being read. The mobile station uses the value given in the NAWC (number of additional words coming) field of the system parameter overhead message train to determine that all messages of the train have been received by the mobile station. If the mobile station does not receive a recognizable overhead message from the strongest or second strongest dedicated control channel which the mobile station is tuned to, the mobile station will default and begin to scan control channels from a non-preferred system (step 409). Otherwise, the mobile station determines that a recognizable overhead message train has been received from the preferred system on the strongest or second strongest primary control channel being read.

At step 403, the mobile station makes another determination as to whether the reserved PCI field, utilized herein as the LSCI-bits, are in an active or inactive state. In the situation where the LSCI-bits are in an active state, e.g. a value of 01 or 10, the mobile station will begin to scan the primary paging channels at step 408. The mobile station then enters a verify overhead information state (step 410) where the mobile station will verify the identity of the land system generating the control channel being read. At step 411, the mobile station enters an idle state at which point the mobile station continues with the protocol sequence for a communication connection.

If the mobile station, at step 403, determines that the LSCI-bits are in an inactive state, e.g. a value of 00, the mobile station begins to scan the secondary set of dedicated control channels associated with a second preferred land system, for example, system A' (step 404). At this point, the mobile station once again examines the signal strength of each of the secondary dedicated control channels, and only the channel with the strongest or second strongest signal strength will be read by the mobile station. At step 405, the mobile station determines whether a recognizable overhead message train associated with the secondary control channel being read by the mobile station is received. In the case that no recognizable overhead message train associated with the secondary control channel being read is received at the mobile station, one of two operations is possible. First, if the mobile station scanning the secondary control channels has digital communication capabilities only (step 406), the mobile station will defer to scanning primary control channels associated with a non-preferred system. Second, in the event that the mobile station scanning the secondary control channels has analog or dual analog/digital communication capabilities, the mobile station will begin scanning the primary paging channels in order to establish a call connection (step 408).

In the case that the mobile station at step 405 receives a proper overhead message train, the mobile station will begin scanning the secondary paging channels in order to establish a communication link with the secondary preferred system (step 407).

Referring now to FIG. 5, an exemplary cellular system with cells of varying sizes in a cellular network with both analog and digital voice/data channels is illustrated. The present invention as implemented, provides for a primary set of control channels for use with the analog voice channels and the secondary set of control channels for use with the digital channels.

In the example illustrated, the first situation which must be considered occurs when digital communication channels are introduced, i.e. when the communication traffic associated with mobile stations having only digital capabilities is very low as compared with the communication traffic of mobile stations having only analog communication capabilities. In the exemplary system illustrated, each of the hexagons 501 represents the analog network, and the associated centers or base sites 502 of these hexagons are the sites of the analog base stations.

Now a digital overlay network having larger cells is introduced to the analog network, one of the digital cells 503 being depicted in FIG. 5 using dash lines. The associated base site of this digital cell is at the center 500 of this cell and coincides with an existing analog site 502. The signal strength utilized in this large digital cell is much stronger than the signal strength used in the smaller analog cells 501. It can be appreciated that signal strength is equal for control channels and voice/data channels of the same cell. This is due to the selection of a cell at the setting up or handing off of calls which are based primarily on the signal strength of the control channels which should correlate well with the quality of the voice/data channel assigned thereto.

When the communication traffic which is associated with mobile stations having digital capabilities increases, the large digital cell 503 may split into seven smaller hexagon cells 504, as shown in FIG. 5 using existing base sites 502 of previous analog cells 501. The next logical split in the digital overlay network results in the hexagon cells 501 originally used for the analog network, while still utilizing existing sites 502. However, the next split (the last split illustrated in FIG. 5) requires six new sites 505 and one existing site 500.

An opposite result is expected to occur with respect to the analog network, due to the replacement of mobile stations with only analog capabilities by mobile stations with digital capabilities, thus resulting in the reduction of the analog communication traffic. The hexagon cells 501 of the analog network may combine into three times fewer hexagon cells having three times the original size. The next developmental step may provide a larger type of cell which could be up to seven times as large as originally designed. The splitting of cells in the digital overlay network and the combining of cells in the analog network are likely to take place simultaneously.

It should be noted that the use of different cell sizes in the analog and digital networks, respectively, is a feature that becomes possible because of the present invention. The larger cells of one network, with control channels having larger signal strengths do not compete for communication traffic with the smaller cells in the other network which have control channels with lower signal strengths, due to the fact that the control channel sets are scanned separately.

A further feature of the present invention is the possibility of using different frequency plans in the two networks. If this is done, it is important to assign voice/data channels contiguous in the frequency band to each of the networks, in order to have to consider the adjacent frequency disturbance coming from the other network only in the case of the two frequencies in the middle where frequency bands overlap.

What is claimed is:

1. A method for operating a mobile station to establish communication connections over control channels between a mobile station and a land system designed for digital traffic channels only, comprising the steps of:
    scanning a primary set of control channels in order to select a first channel generated from a first preferred transmission system;
    reading said first channel of said primary set of control channels;
    detecting a set of indicating bits associated with said first channel;
    determining whether said indicating bits are in an active state or an inactive state, said active state indicating that said first preferred transmission system has digital communication capabilities, said inactive state indicating that said first preferred transmission system has only analog communication capabilities;
    utilizing said primary control channels in response to said indicating bits being in an active state; and
    initiating a scanning of any secondary set of control channels generated from a second preferred transmission system in response to said indicating bits being in an inactive state.

2. A method according to claim 1, wherein the step of utilizing said primary control channels includes the step of scanning a primary set of paging channels associated with said primary set of control channels.

3. A method according to claim 1, further comprising the step of reading a second channel associated with said secondary set of control channels in response to the step of initiating a scanning of said secondary set of control channels.

4. A method according to claim 3, further comprising the step of determining whether a recognizable overhead message is received by said mobile station on said second channel.

5. A method according to claim 4, further comprising the step of determining whether said land system has only digital communication capabilities in response to a determination that a recognizable overhead message has not been received by said mobile station on said second channel.

6. A method according to claim 5, further comprising the step of scanning said primary set of paging channels associated with said primary control channels in response to a determination that said mobile station does not have only digital communication capabilities.

7. A method according to claim 5, further comprising the step of scanning a primary set of control channels associated with a non-preferred system in response to a determination that said land system has only digital communication capabilities.

8. A method according to claim 4, further comprising the step of scanning a secondary set of paging channels associated with said secondary set of control channels in response to a determination that a recognizable overhead message has been received by said mobile station on said second channel.

9. A mobile cellular radio telephone system including a mobile station and a base station designed for digital traffic channels only or digital and analog traffic channels, comprising:
scanning means for scanning a primary set of control channels in order to select a first channel from a first preferred transmission system;
reading means for reading said first channel of said primary set of control channels;
detecting means for detecting a set of indicating bits associated with said first channel which indicate whether said first preferred transmission system has digital communication capabilities;
utilizing means for utilizing said primary control channels in response to said indicating bits indicating that said first preferred transmission system has digital communication capabilities; and
initiating means for initiating a scanning by said scanning means of any secondary set of control channels generated from a second preferred transmission system in response to said indicating bits indicating that said first preferred transmission system does not have digital communication capabilities.

10. A system according to claim 9, wherein said primary scanning means, said reading means, said detecting means, said utilizing means, and said initiating means are configured in a cellular mobile station.

11. A system according to claim 9, wherein said indicating bits associated with said first channel are part of a system parameter overhead message train transmitted on said first channel from said first preferred transmission system.

12. A system according to claim 9, wherein said scanning means being operable for scanning primary paging channels associated with said primary set of control channels in response to said utilizing means utilizing said primary control channels.

13. A system according to claim 9, wherein said reading means being operable for reading a second channel associated with said secondary set of control channels in response to said initiating means initiating a scanning of said secondary set of control channels.

14. A system according to claim 13, wherein said detecting means being further operable for detecting whether a recognizable overhead message is received by said mobile station on said second channel.

15. A system according to claim 14, wherein said detecting means being further operable for detecting whether said mobile station has only digital communication capabilities in response to a detection that a recognizable overhead message has not been received by said mobile station on said second channel.

16. A system according to claim 15, wherein said scanning means being further operable for scanning said primary paging channels associated with said primary control channels in response to a detection that said mobile station does not have only digital communication capabilities.

17. A system according to claim 15, wherein said scanning means being further operable for scanning a primary set of control channels associated with a non-preferred system in response to a detection that said mobile station has only digital communication capabilities.

18. A system according to claim 14, wherein said scanning means being further operable for scanning a secondary set of paging channels associated with said secondary set of control channels in response to a detection that a recognizable overhead message has been received by said mobile station on said second channel.

19. A system according to claim 9, wherein said first channel is a channel having the highest signal strength of said primary set of control channels.

20. A system according to claim 13, wherein said second channel is a channel having the highest signal strength of said secondary set of control channels.

21. A system according to claim 11, wherein said indicating bits are protocol capability indicator bits of said system parameter overhead message train.

22. A method for providing communication channels of a first data communication type in an existing cellular telephone system having communication channels of a second data communication type, said existing cellular telephone system including a mobile station and base station designed for utilizing communication channels of said first data communication type only or communication channels of said first and second data communication type, comprising the steps of:
scanning a set of primary control channels for a first channel generated from a first preferred communication system having communication capabilities of said second data communication type;
reading a first message from said first channel of said primary control channels;
detecting a set of indicating bits associated with said first message which indicate whether said first preferred communication system has communication capabilities of said first data communication type or said second data communication type;
determining in accordance with said indicating bits whether said first preferred communication system has communication capabilities of said first data communication type or said second data communication type;

utilizing said primary control channels in response to said indicating bits indicating that said first preferred communication system has communication capabilities of said first data communication type; and initiating a scanning of a set of secondary control channels generated from a second preferred communication system in response to said indicating bits indicating that said first preferred communication system does not have communication capabilities of said first data communication type.

23. A method according to claim 22, wherein the step of utilizing said primary control channels includes the step of scanning a set of primary paging channels associated with said set of primary control channels.

24. A method according to claim 22, further comprising the step of reading a second channel associated with said set of secondary control channels in response to the step of initiating a scanning of said set of secondary control channels.

25. A method according to claim 24, further comprising the step of determining whether a recognizable overhead message is received by said mobile station on said second channel.

26. A method according to claim 25, further comprising the step of determining whether said mobile station has only communication capabilities of said first data communication type in response to a determination that a recognizable overhead message has not been received by said mobile station on said second channel.

27. A method according to claim 26, further comprising the step of scanning said primary set of paging channels associated with said primary control channels in response to a determination that said mobile station does not have only communication capabilities of said first data communication type.

28. A method according to claim 26, further comprising the step of scanning a primary set of control channels associated with a non-preferred system in response to a determination that said mobile station has only communication capabilities of said first data communication type.

29. A method according to claim 25, further comprising the step of scanning a secondary set of paging channels associated with said secondary set of control channels in response to a determination that a recognizable overhead message has been received by said mobile station on said second channel.

30. A method according to claim 22, wherein said first data communication type is digital and said second data communication type is analog.

31. A method according to claim 22, wherein said first data communication type is analog and said second data communication type is digital.

32. A mobile cellular radio telephone system comprising:

a first preferred transmission system which generates a primary set of control channels;

a second preferred transmission system which generates a secondary set of control channels;

means in said first preferred transmission system for transmitting a first message on said primary control channels, said first message having associated therewith a set of indicating bits which indicate whether said first preferred transmission system has digital communication capabilities; and a mobile station including means operable for initially scanning said primary control channels and reading said first message from said primary control channels; wherein said a mobile station includes means for utilizing said primary control channels in response to said indicating bits indicating that said first preferred transmission system has digital communication capabilities, and for scanning said secondary control channels in response to said indicating bits indicating that said first preferred transmission system does not have digital communication capabilities.

33. A system according to claim 32, wherein said indicating bits indicate digital communication capabilities when in an active state, and said indicating bits indicate a lack of digital communication capabilities when in an inactive state.

34. A system according to claim 33, wherein said mobile station includes means operable for scanning a set of primary paging channels associated with said primary control channels in response to said indicating bits being in an active state.

35. A system according to claim 34, wherein said mobile station includes means for determines whether a recognizable overhead message is received on said secondary control channels.

36. A system according to claim 35, wherein said mobile station includes means for initiating a scanning of said primary paging channels in response to a determination that a recognizable overhead message has not been received on said secondary control channels and said mobile station does not have only digital communication capabilities.

37. A system according to claim 35, wherein said mobile station includes means for initiating a scanning of a primary set of control channels associated with a non-preferred system in response to a determination that a recognizable overhead message has not been received on said secondary control channels and said mobile station has only digital communication capabilities.

38. A system according to claim 35, wherein said mobile station includes means for initiating a scanning of a secondary set of paging channels associated with said secondary set of control channels in response to a determination that a recognizable overhead message has been received on said secondary control channels.

39. A method for establishing a communication connection between a mobile station and a base station in a mobile cellular telephone system, comprising the steps of:

transmitting on primary set of control channels associated with a first preferred transmission system;

transmitting on a secondary set of control channels associated with a second preferred transmission system;

transmitting a first message on said primary control channels, said first message having associated therewith a set of indicating bits which indicate whether said first preferred transmission system has digital communication capabilities;

scanning said primary control channels and reading said first message from said primary control channels;

utilizing said primary control channels in response to said indicating bits indicating that said first preferred transmission system has digital communication capabilities; and scanning said secondary control channels in response to said indicating bits indicating that said first preferred transmission system does not have digital communication capabilities.

40. A method according to claim 39, further comprising the step of scanning a set of primary paging channels associated with said primary control channels in response to said indicating bits indicating that said first preferred transmission system has digital communication capabilities.

41. A method according to claim 39, further comprising the step of determining whether a recognizable overhead message is received by said mobile station on said secondary control channels.

42. A method according to claim 41, further comprising the step of determining whether said mobile station has only digital communication capabilities in response to a determination that a recognizable overhead message has not been received by said mobile station on said secondary control channels.

43. A method according to claim 42, further comprising the step of scanning said primary set of paging channels associated with said primary control channels in response to a determination that said mobile station does not have only digital communication capabilities.

44. A method according to claim 42, further comprising the step of scanning a primary set of control channels associated with a non-preferred system in response to a determination that said mobile station has only digital communication capabilities.

45. A method according to claim 41, further comprising the step of scanning a secondary set of paging channels associated with said secondary set of control channels in response to a determination that a recognizable overhead message has been received by said mobile station on said secondary control channels.

* * * * *